United States Patent
Krueger et al.

(10) Patent No.: US 8,351,883 B2
(45) Date of Patent: *Jan. 8, 2013

(54) MOMENTARY BURST PROTOCOL FOR WIRELESS COMMUNICATION

(75) Inventors: Scott Krueger, San Francisco, CA (US); Gregory Lydon, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/085,032

(22) Filed: Apr. 12, 2011

(65) Prior Publication Data

US 2011/0188431 A1    Aug. 4, 2011

Related U.S. Application Data

(63) Continuation of application No. 12/030,754, filed on Feb. 13, 2008, now Pat. No. 7,949,317.

(51) Int. Cl.
*H04B 1/04* (2006.01)
*H04K 3/00* (2006.01)

(52) U.S. Cl. ................ 455/127.5; 455/343.2; 455/574; 370/311

(58) Field of Classification Search ............... 455/127.5, 455/343.2–343.4, 574; 340/7.32, 7.34, 7.38; 370/311, 338

See application file for complete search history.

(56) References Cited

U.S. PATENT DOCUMENTS

| 7,949,317 | B2 | 5/2011 | Krueger et al. |
| 2004/0147202 | A1* | 7/2004 | Brabrand ............... 446/454 |
| 2007/0080823 | A1* | 4/2007 | Fu et al. ............... 340/825.22 |
| 2007/0165593 | A1 | 7/2007 | Hundai et al. |
| 2009/0052412 | A1 | 2/2009 | Kumar et al. |
| 2009/0203393 | A1 | 8/2009 | Krueger et al. |

OTHER PUBLICATIONS

Non-Final Office Action of Nov. 2, 2010 for U.S. Appl. No. 12/030,754, 6 pages.
Notice of Allowance of Feb. 17, 2011 for U.S. Appl. No. 12/030,754, 5 pages.

* cited by examiner

*Primary Examiner* — Lee Nguyen
(74) *Attorney, Agent, or Firm* — Kilpatrick Townsend & Stockton LLP (57) ABSTRACT

A method for communicating data using a "burst protocol" includes enabling power to transmitters and receivers when needed to balance power consumption with latency and unscheduled communication. A transmitter transmits a plurality of packets indicative of substantially the same payload. Power then may be disabled to the transmitter. A first predetermined time is determined to enable a receiver. A second predetermined time is determined to disable the receiver. Power then may be enabled to the receiver based on the first predetermined time. The payload is output in response to receiving one or more of the plurality of packets. Power to the receiver is disabled based on the second predetermined time.

14 Claims, 8 Drawing Sheets

MOMENTARY BURST PROTOCOL FOR WIRELESS COMMUNICATION

CROSS REFERENCE TO RELATED APPLICATIONS

This application is a continuation of and claims priority to U.S. patent application Ser. No. 12/030,754 filed Feb. 13, 2008, the entire disclosure of which is incorporated by reference herein for all purposes.

This application is related to co-pending U.S. patent application Ser. No. 12/030,774, filed Feb. 13, 2008 and entitled "Method for Using Bluetooth Module to Process Non-Bluetooth Signals," the entire disclosure of which is incorporated by reference herein for all purposes.

FIELD OF THE INVENTION

The present invention relates to communication protocols. More specifically, the present invention relates to techniques for wireless communication using a momentary burst protocol.

BACKGROUND OF THE INVENTION

Electronic devices, such as portable media players, cellular phones, personal digital assists (PDAs), and the like, are prevalent in today's marketplace, as are the peripheral electronic devices that support their use, such as docking stations and the like. As competition in the personal electronics marketplace becomes ever more heated, consumers have become more demanding in terms of both the functionality and use of such devices.

As more and more functionalities are packaged in an electronic device, the power requirements of the electronics also increase. Portable electronic devices are typically powered by an internal battery when the device is disconnected from an external power source. Because power conservation is paramount to sustain the electronic device as long as possible from the internal battery, power management techniques may be provided to monitor and control various circuit operations. In some devices, the battery or power source may be embedded and very difficult or physically impossible for a user to replace. Therefore, any type of power savings that can be gained are very important to prolong the life of the power source that enables these types of devices.

Many power saving techniques have been introduced to try to mitigate the impact of battery power constraints. Since leaving power enabled to idle circuitry also consumes power, a common power management technique disables power to those circuits or portions of the device that are not being used. However, this often leads to the device being unresponsive to a user until power is re-enabled to those circuits or portions of the device that were powered down. This latency, while frustrating to some users, also causes problems for communication between devices, as a device whose transceiver is powered down cannot send or receive communications.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

In various embodiments, using a "momentary burst protocol" transmitters and receivers may operate using better power management, while also providing responsiveness and accuracy for unscheduled transmissions of data. A combination of a minimum burst interval of the transmitter and an adjustable receive window and receive interval of the receiver increases responsiveness and the likelihood that successful communication of unscheduled transmissions will occur between transmitters and receivers, all the while providing power savings to both devices.

In some embodiments, a transmitting device "power up" or otherwise enable a transmitter in response to an event. For example, a wireless remote control can power up its radio transmitter as soon as a user presses a button. Transmission of button status information can begin as soon as the button press event occurs. Therefore, the wireless remote control can remain in a low-power state for an extended period of time and power on its radio transmitter when button status information needs to be transmitted.

In various embodiments, a transmitting device can transmit packet "bursts" after powering on its transmitter. A packet burst can be a series or sequence of packets containing redundant packets or substantially identical payloads. The packet bursts or series of redundant packets increases the likelihood that payload data will be received by a receiver, since the event causing the transmission may be unscheduled and occur at any time. Moreover, packet bursts can be transmitted during a minimum burst interval correlated to when a receiving device listens for unscheduled transmission. Thus, the minimum burst interval increases the likelihood that, for at least during the burst interval, the receiving device will be listening to intercept one or more of the redundant packets included in the packet burst.

According to further embodiments, a receiving device listens for transmissions for a predetermined duration (a receive window). Each receive window can be schedule to begin at a predetermined interval (a receive interval), at which point the received device powers on or enables a receiver. For example, a device wirelessly controlled by the wireless remote of the previous example may enable its radio receiver at the beginning of the receive interval to listen for unscheduled transmission from the wireless remote control.

At the end of the receive window, if no transmissions have been detected, the receiving device can power down its receiver until the beginning of the next receive interval. Thus, the receiving device may periodically "wake up" and listen for unscheduled transmissions, rather than continuously powering its radio thereby listening full time and wasting power. In some embodiments, the receiving device may also adjust the size of the receive window during which it listens for unscheduled transmissions and how often it listens (i.e., the receive interval) to balance responsiveness and power consumption.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

In order to better understand the present invention, aspects of the environment within which various embodiments operate will first be described.

Figure 1:
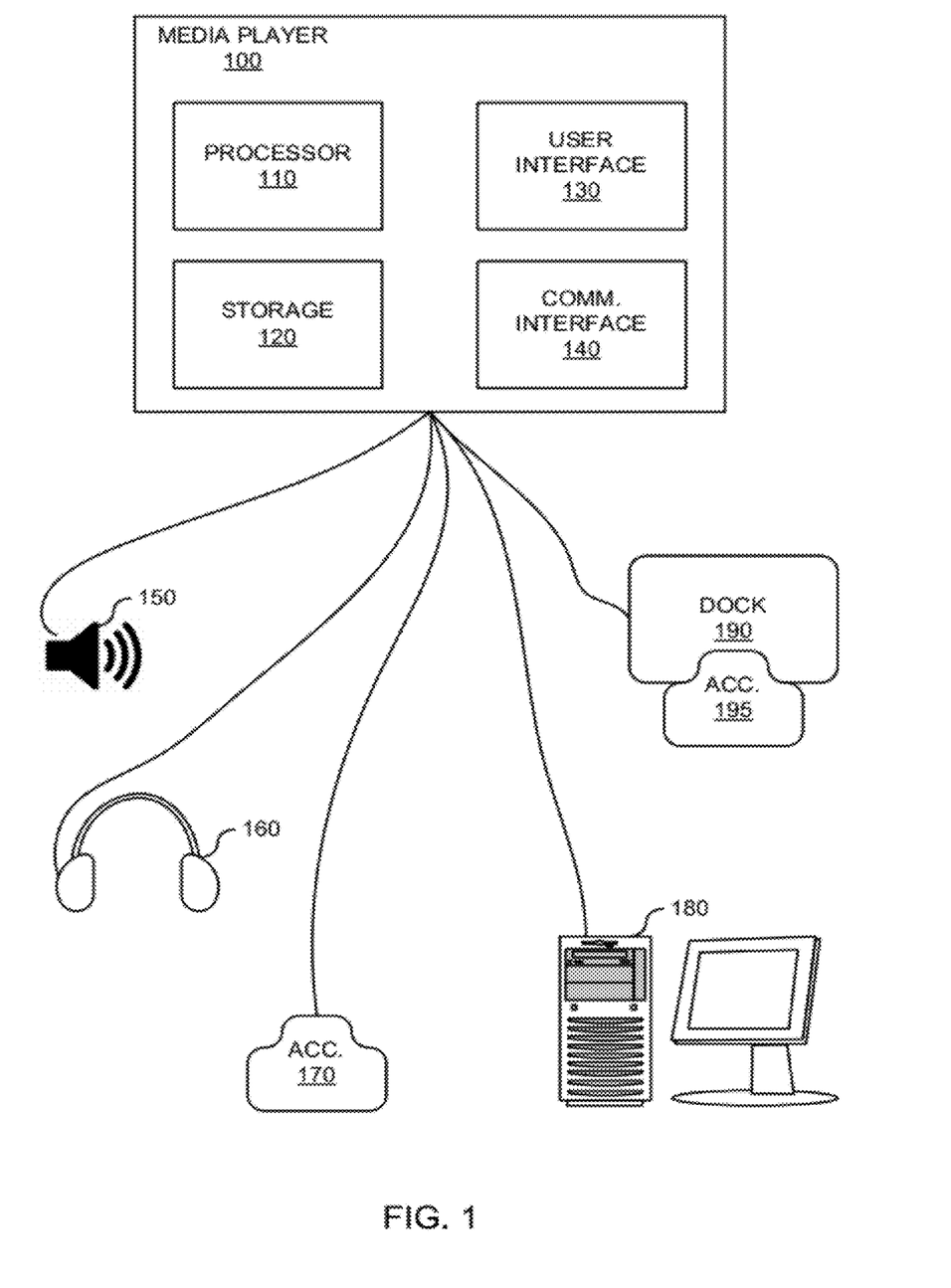
FIG. 1 is a block diagram of a media player that may incorporate embodiments of the present invention.

FIG. 1 is a block diagram of media player 100 that may incorporate embodiments of the present invention. In general, a media player stores content and/or media assets, such as audio tracks, movies, or photos that can be played or displayed on the media player. One example of media player 100 is the iPod® media player, which is available from Apple, Inc. of Cupertino, Calif. Another example of media player 100 is a personal computer, such as a laptop or desktop.

In this example, media player 100 includes processor 110, storage 120, user interface 130, and communications interface 140. In general, processor 110 controls various functionalities associated with media player 110. Media play 100 may output audio content, video content, image content, and the like. Media player 100 may further output information associated with content, such as track information and album art.

Typically, a user may load or store content using storage 120. Storage 120 may be any read-only memory (ROM), random access memory (RAM), non-volatile memory, flash memory, floppy disk, hard disk, and the like. A user may interact with user interface 130 of media player 100 to view or consume content. Some examples of user interface 130 are buttons, click wheels, touch pads, displays, touch screens, and other input/output devices.

Media player 100 typically includes one or more connectors or ports that can be used to load content, retrieve content, interact with applications running on media player 100, interface with external devices, and the like. In this example, media player 100 includes communications interface 140. Some examples of communications interface 140 include universal serial bus (USB) interfaces, IEEE 1394 (or FireWire/iLink®) interfaces, universal asynchronous receiver/transmitters (UARTs), wired and wireless network interfaces, transceivers, and the like. Media player 100 may connect to devices, accessories, private and public communications networks, such as the Internet and the like using communications interface 140.

In one example, a connector or port may enable media player 100 to output audio to a pair of speakers 150. In another example, a connector or port may enable media player to output audio to a pair of headphones 160. In yet another example, a connector or port may enable media player 100 to interface with an accessory 170, a host computer 180, or be inserted into a docking system 190.

Docking system 190 may further enable one or more accessory devices 195 to interface with media player 100. There are today many different types of accessory devices 170 and 195 that can interconnect to media player 100. For example, an accessory may allow a remote control to wirelessly control media player 100. As another example, an automobile may include a connector into which media player 100 may be inserted such that an automobile media system can interact with media player 100, thereby allowing media content stored on media player 100 to be played within the automobile.

Often, media player 100 receives content or other media assets from a computer system (e.g., host computer 160) that serves to enable a user to manage media assets. As an example, communications interface 140 allows media player 100 to interface with host computer 160. Host computer 160 executes a media management application to manage media assets, such as loading songs, movies, photos, and the like onto media player 100 and creating playlists. One example of a media management application is iTunes®, produced by Apple, Inc. of Cupertino, Calif.

In various embodiments, media player 100 includes a radio associated with communications interface 140 or is coupled to an accessory that includes a radio. The radio allows media player 100 to wirelessly send and receive data.

Figure 2A:
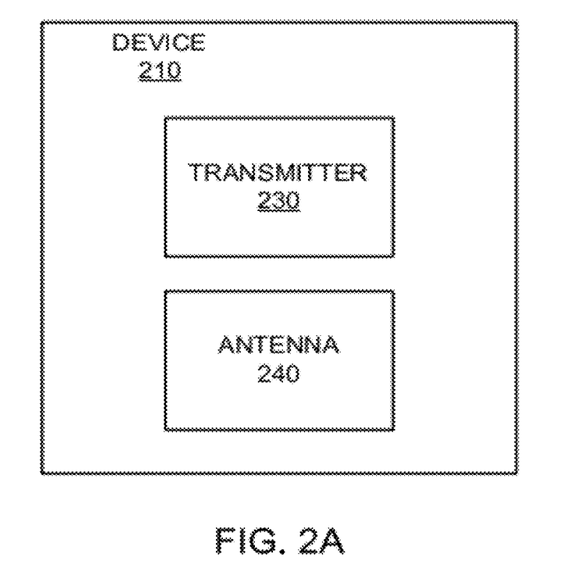
FIGS. 2A and 2B are block diagrams of a transmitting device and a receiving device in one embodiment according to the present invention.
Figure 2B:
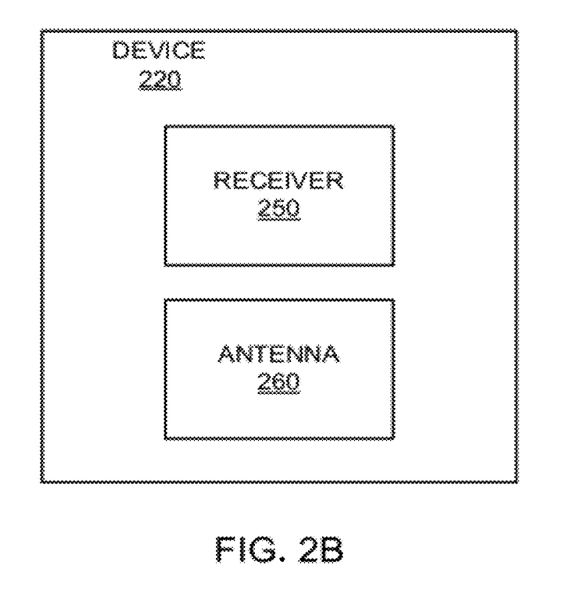

FIGS. 2A and 2B are block diagram of transmitting device 210 and receiving device 220 in one embodiment according to the present invention. In various embodiments, media player 100 can be transmitting device 210 and configured to transmit data. Media player 100 may also be receiving device 220, and configured to receive data.

In this example, transmitting device 210 includes transmitter 230 and antenna 240. Transmitter 230 can be any hardware and/or software elements configured to transmit data. Transmitter 230 may include a radio configured to transmit data wirelessly via antenna 240 using a number of formats or protocols. Some examples of protocols may be IEEE 802.11 or WiFi, IEEE 802.15 or Bluetooth, IEEE 802.16 or WiMAX, CDMA, GSM, or other wired and wireless protocols. Some examples of transmitting device 210 may be media player 100 acting as a transmitter, a wireless remote control, a remote sensor, a wireless accessory, or the like.

Receiving device 220 includes receiver 250 and antenna 260. Receiver 250 can be any hardware and/or software elements configured to receive data. Receiver 250 may include a radio configured to receive data wirelessly via antenna 260 using a number of formats or protocols, such as those discussed above. Some examples of receiving device 250 may be media player 100 acting as a receiver, a wireless accessory, or the like.

In operation, transmitting device 210 may be embodied as media player 100 or as accessories, such as wireless remote controls, that include ultra-low power transmitters. By using a "momentary burst protocol," transmitting device 210 may only power up transmitter 230 in response to an event. For example, a wireless remote control may only need to power up its transmitter to transmit button status information as soon as a user presses a button. Transmission of the information can begin as soon as the button press event occurs, thus, the wireless remote control may remain in a low-power state for an extended period of time and only need to power on its radio when the information needs to be transmitted.

Additionally, the momentary burst protocol "bursts" a series or sequence of packets containing redundant or substantially identical payloads. Because, the transmission may be unscheduled, the series of redundant packets increase the likelihood that the data will be received by a receiver. In addition, packets are transmitted during a minimum burst interval that increases the likelihood that for at least during the burst interval, a receiving device (e.g., receiving device 220) will be listening to intercept one or more of the redundant packets.

Typically, to perform wireless communication, receiving device 220 needs to enable receiver 250 (or an associated radio) full time in order to receive unscheduled transmissions from transmitter 230. However, receiving device 220 may operate using batteries or utilize a low-power source, and therefore the power draw incurred by continuously powering the radio may be prohibitive. Therefore, receiving device 220 may employ one or more power management features to optimize power consumption in combination with the momentary burst protocol.

According to some embodiments, to conserve power, receiving device 220 (e.g., media player 100) enables receiver 250 to listen for transmissions for a predetermined duration (a receive window). Each receive window can be scheduled to begin at a predetermined interval (a receive interval). At the end of the receive window, if no transmissions have been detected, receiver 220 can disable power to receiver 250 until the beginning of the next receive interval. Thus, receiving device 220 may periodically "wake up" and listen for unscheduled transmissions, rather than listening full time and wasting power. Receiving device 220 may also adjust the size of the receive window during which it listens for unscheduled transmissions and how often it listens (i.e., the receive interval) to balance responsiveness and power consumption.

Accordingly, the momentary burst protocol enables transmitters and receivers to operate using better power management, while also providing responsiveness and accuracy for unscheduled transmissions of data. Moreover, because of the combination of the minimum burst interval of the transmitter, and the adjustable receive window and receive interval of the receiver, the likelihood can be increased that successful communication of unscheduled transmissions will occur between transmitters and receivers.

Figure 3:
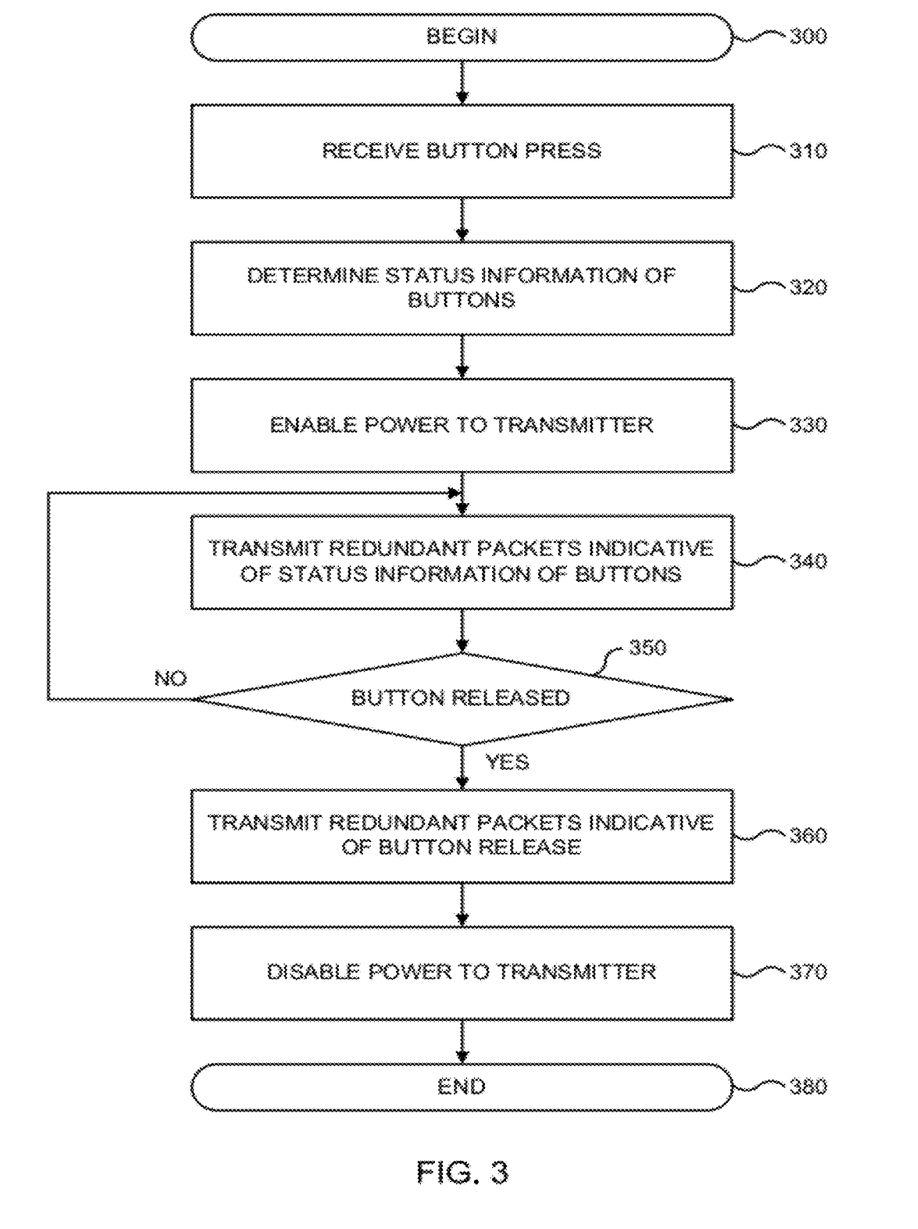
FIG. 3 is a flowchart of a method for transmitting data from a wireless remote in one embodiment according to the present invention.

FIG. 3 is a flowchart of a method for transmitting data from a wireless remote (e.g., transmitting device 210 of FIG. 2) in one embodiment according to the present invention. The processing depicted in FIG. 3 may be performed by software modules (e.g., instructions or code) executed by a processor of a computer system, by hardware modules of a device, or combinations thereof. FIG. 3 begins in step 300.

In step 310, a button press is received. In step 320, status information associated with buttons of the wireless remote is determined. In general, status information include the state or status of a button, such as up, down, moved, direction, and the like.

In step 330, power is enabled to a transmitter (e.g., transmitter 230 of FIG. 2). In step 340, redundant packets indicative of the status information of the buttons are transmitted. For example, the transmitter may transmit a predetermined number of packets in succession over a predetermined interval. Each of the redundant packets may contain substantially the same payload indicative of the status or state of all or a subset of the buttons associated with the wireless remote. In some embodiments, each of the plurality of packets may contain the same payload identifier indicating that other packets with the same payload identifier fundamentally contain the same payload.

In step 350, a determination is made whether the button has been released. If the button has not been released, additional redundant packets may be transmitted in step 330. If the button has been released, in step 360, new redundant packets indicative of the button release are transmitted. In step 370, power to the transmitter is disabled. FIG. 3 ends in step 380.

Accordingly, the radio associated with the wireless remote control can be enabled at any time in response to button events and changes in button status. Additionally, redundant packets having substantially the same payload indicative of the status information of the buttons are transmitted such that the likelihood increases that a receiver looking for unscheduled transmission will receive and interpret the redundant transmissions successfully.

Figure 4A:
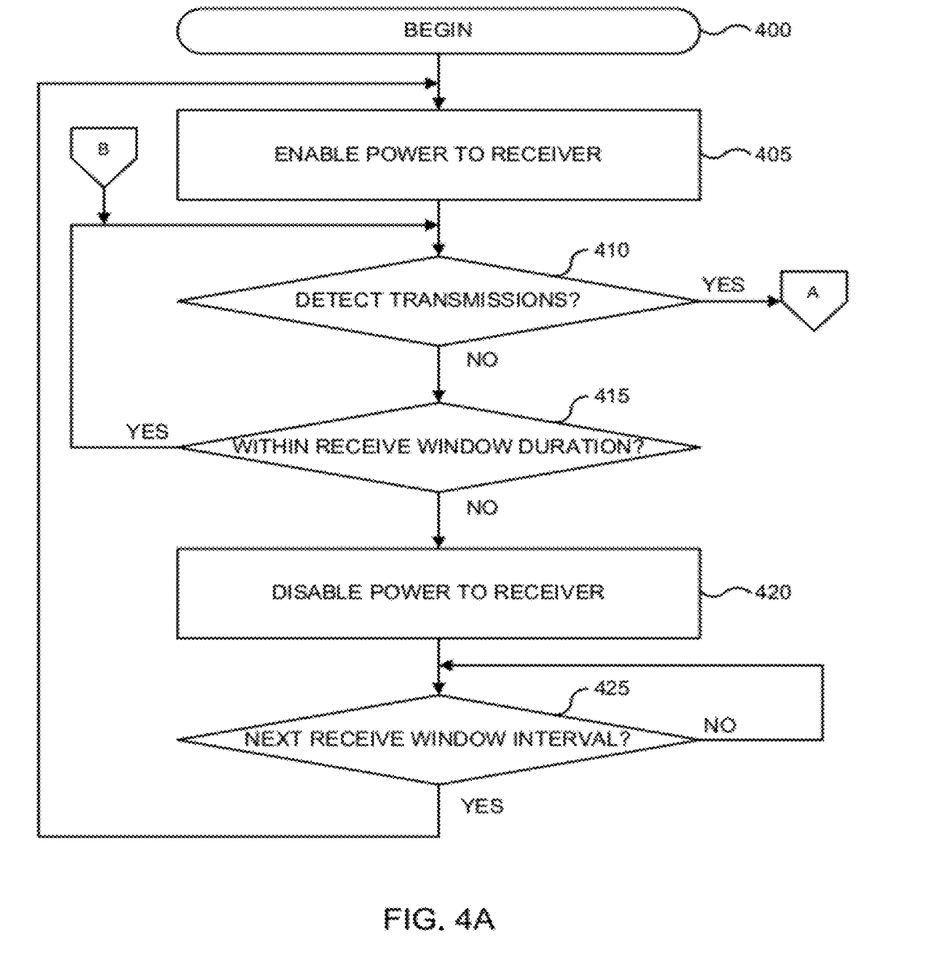
FIGS. 4A and 4B are a flowchart of a method for receiving data in one embodiment according to the present invention.
Figure 4B:
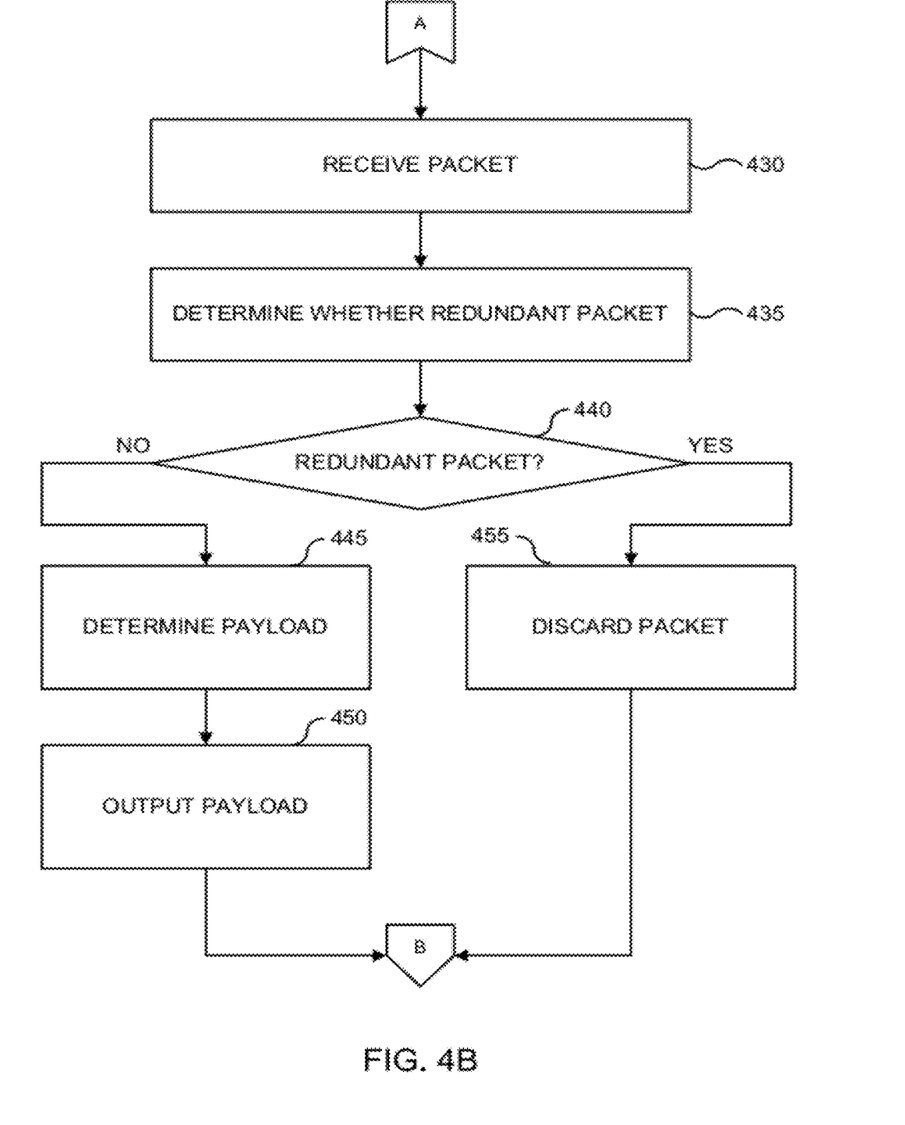

FIGS. 4A and 4B are a flowchart of a method for receiving data in one embodiment according to the present invention. FIG. 4A begins in step 400.

In step 405, power is enabled to a receiver (e.g., receiver 250 of FIG. 2). In step 410, a determination is made whether a transmission is detected. If no transmissions are detected, in step 415, a determination is made whether the current time within a receive window duration. In general, the window duration specifies the duration or how long a receiver will listen to transmissions. If the current time is within the receive window duration, the receiver continues to look for transmissions in step 410. If the current time is outside of the window duration, in step 420, power is disabled to the receiver.

In step 425, a determination is made whether the current time is within the next receive window interval. In general, a window interval specifies the interval or how long the receiver will be powered down and not listening for transmissions. If the current time is not within the next receive window interval, the power remains off to the receiver, and the flow will continue until in step 425, the current time is within the next receive window interval. At that time, the power will be enabled to the receiver again in step 405.

Referring to FIG. 4B, if was transmission is detected in step 410 of FIG. 4A, then in step 430, a packet is received. In step 435, a determination is made whether the packet is a redundant packet. For example, each packet may include a payload identifier. The payload identifier of the current packet may be compared to payload identifiers of previously received packets to determine whether the packet contains fundamentally the same payload as a previously received packet.

If the packet is not a redundant packet, in step 445, the payload is determined. In step 450, the payload is output, for example to an operating system or application. If the packet is a redundant packet, in step 455, the packet is discarded. Processing then continues in FIG. 4A in step 410 where the determination is made whether any transmissions are detected.

Figure 5:
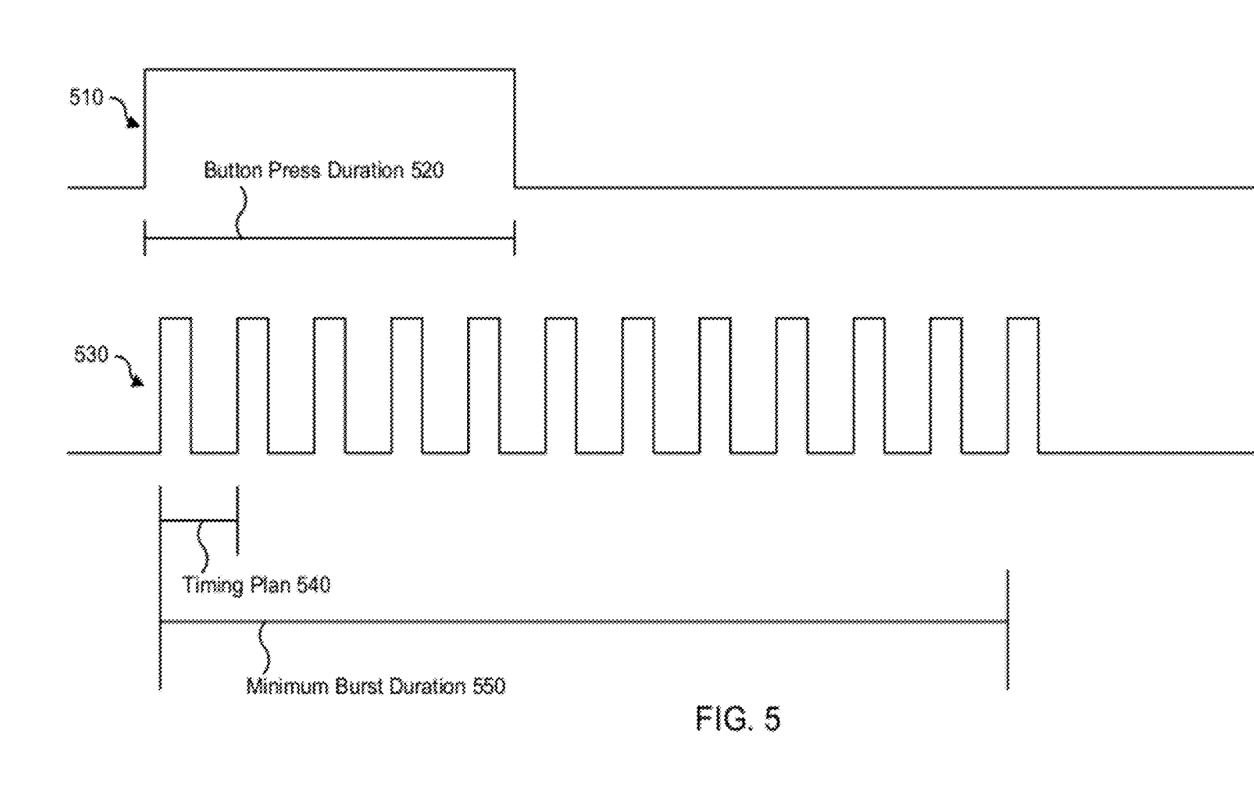
FIG. 5 is a diagram illustrating a transmission protocol using a minimum burst duration in one embodiment according to the present invention.

FIG. 5 is a diagram illustrating a transmission protocol using a minimum burst duration in one embodiment according to the present invention. In this example, a user pressing button associated with a wireless remote control generates button press signal 510 that occurs over button press duration 520 until the user depresses the button.

In response to button press signal 520, a plurality of transmissions 530 are generated. In this example, there are twelve packets transmitted in the plurality of transmissions 530. Each packet is transmitted according to a predetermined timing plan 540 and for a minimum burst duration 550.

In some embodiments, packets are transmitted according to a protocol specification that provides for one-way transmissions that occur on a regular, fixed schedule. In general, transmissions begin and end at the transmitter's discretion. While broadcasting, transmitters provide one-way communication packet scheduling. In this way, a receiver can know when to expect the next packet in the burst.

In order to minimize the required duration of a receiver's receive window, transmitters may transmit on an 8 mS timing plan (e.g., the time between individual transmissions or packets). One-way transmitters on an 8 mS timing plan may "jitter" the packet schedule in 128 μS increments up to +/−1900 μS or approximately 2 mS.

Thus, although a "burst" itself may be unscheduled in various embodiments, transmissions or packets within the burst can come at expected and/or scheduled time relative to the first transmission or packet of the burst. Once any transmission or packet of the burst is received, it may therefore be possible for the receiver to predict when successive packets within the burst will arrive.

To improve interference robustness and avoid problems due to dropped packets, payloads may be transmitted in at least two consecutive packets. Transmission bursts may continue until all remote buttons have been released. In some embodiments, a transmission burst continues until the minimum burst duration requirement has been satisfied. For example, if all buttons are released before the minimum burst duration criteria has been satisfied, the transmitter will continue to transmit the last valid button status and delay transmission of any termination or "all buttons up" status packets until after the minimum burst duration has been exceeded.

If during this time of delaying the "all buttons up" status packets another remote button is pressed, the device should update the transmitted button status to properly reflect the current state of the buttons. If the device is currently delaying transmission of the "all buttons up" status packets, and then the same button(s) are pressed again, then the device may transmit at least two packets of the "all buttons up" status before resuming transmission of the repeated button status. This typically allows double-clicks of a button to be properly communicated.

In some embodiments, payloads may be scrambled in order to obfuscate the data content of each packet. In order to aid receivers in filtering packet redundancy, each packet may contain a payload identifier. The payload identifier typically is the same for consecutive packets that contain fundamentally the same payload data. Receivers are free to ignore successive packets containing the same payload identifier. Receivers may also interpret a change in the payload identifier as a signal that the payload data has changed in some substantive manner.

When a receiver fails to receive two consecutive packets at expected times, the receiver may assume that the transmission burst is complete. Once a burst is finished, the receiver may continue to open up listen for any further unscheduled burst based on power management settings.

Figure 6:
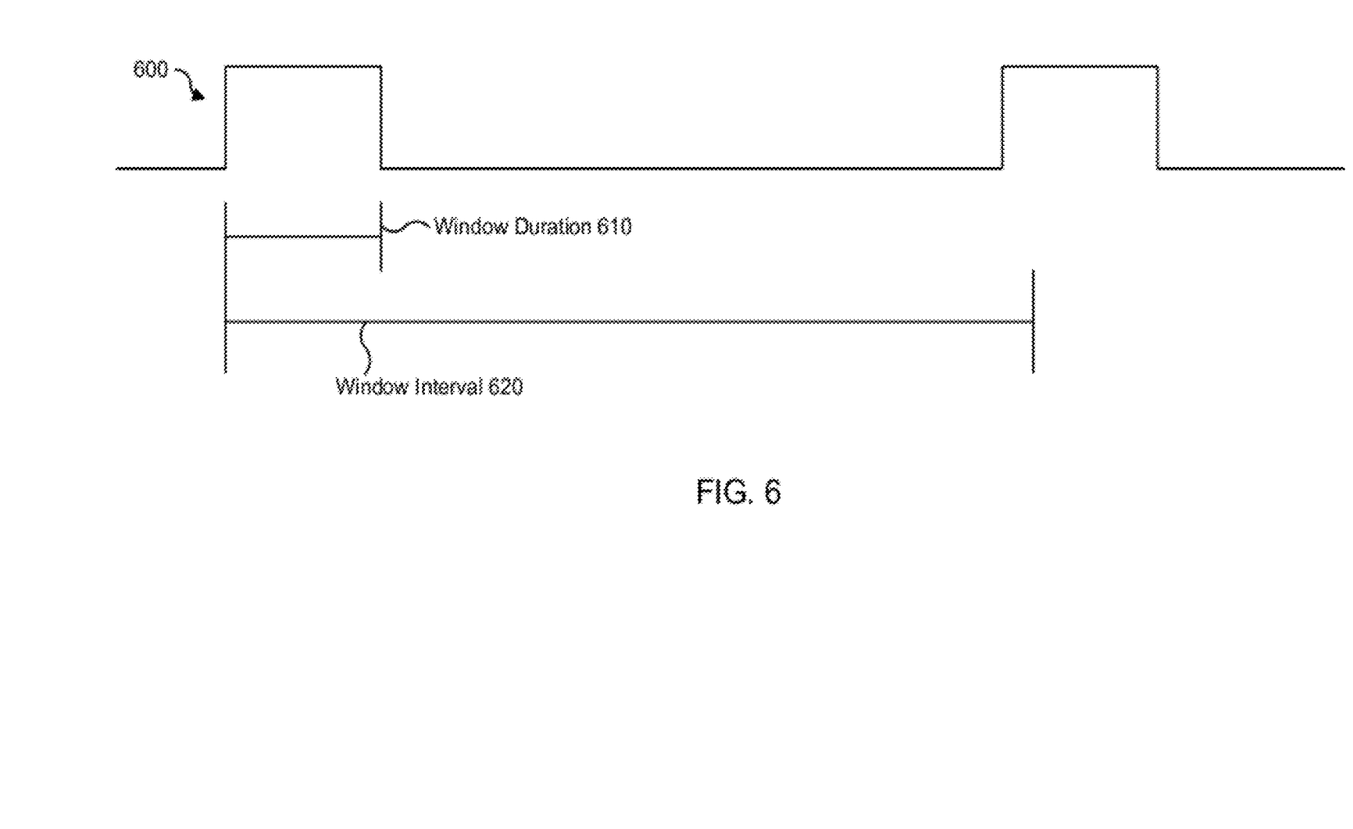
FIG. 6 is a diagram illustrating a receive protocol in one embodiment according to the present invention.

FIG. 6 is a diagram illustrating receive protocol 600 in one embodiment according to the present invention. In this example, power to a receiver's radio is enabled for a predetermined window duration 610 at the beginning of a predetermined window interval 620.

In one embodiment, to receive a packet during a burst transmission, media player 100 will turn on its RF receiver for 13 mS duration receive windows (e.g., receive duration 610). When media player 100 is listening for a transmit burst to begin, these 13 mS receive windows can occur every 100 mS to 250 mS (e.g., window interval 620). In general, the length and frequency of the receive windows can be subject to change at any time based on any number of criteria, such as use and power management. Typically, the receive window scheduling can be implemented in response to how that scheduling might affect system response and data reliability.

In various embodiments, media player 100 simply filters against an incoming packet's source type and source address, and then passes each qualifying packet. However, in the case of devices using burst protocols, the RF packet transmissions may quickly overwhelm media player 100 if each and every packet were passed straight through. Therefore, in some embodiments, media player 100 minimizes pass-through of redundant packets received from momentary burst transmitters. For example, media player 100 may include a set of rules or filters that limit packet pass-through of redundant packets with a momentary burst transmitter source type based on a payload identifier and payload type.

Figure 7:
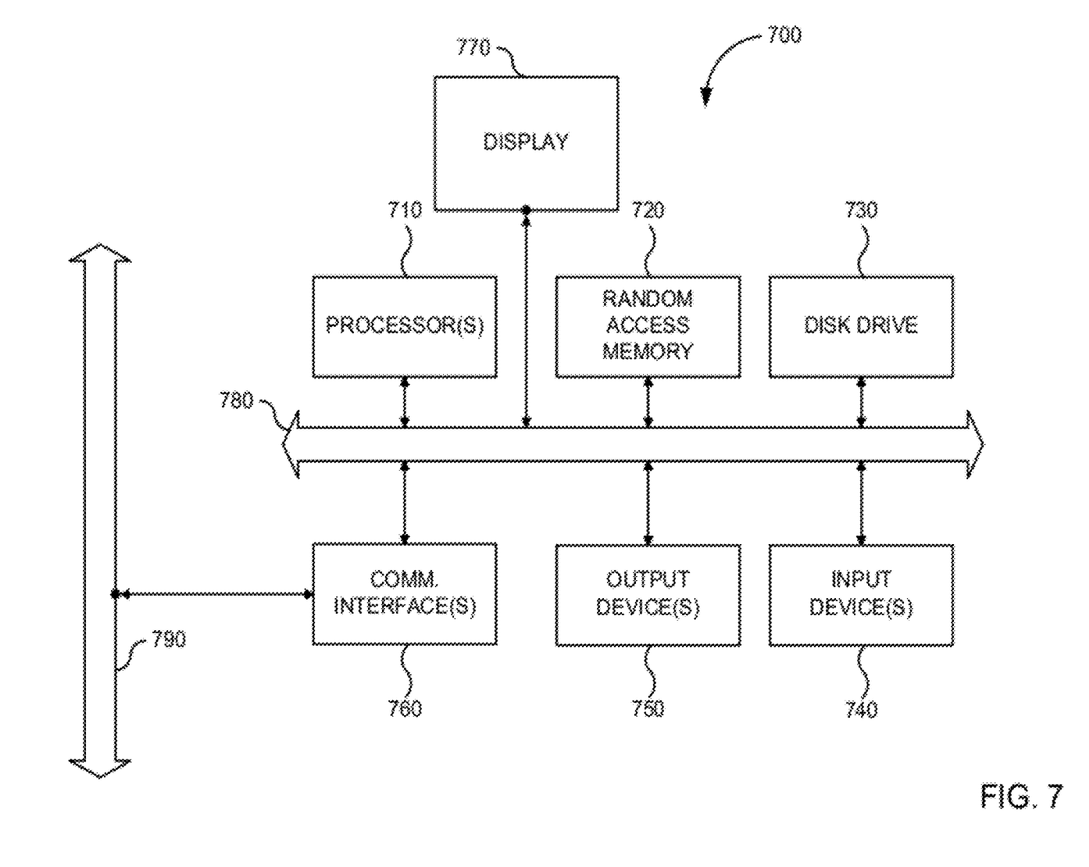
FIG. 7 is a simplified block diagram of a computer system that may incorporate embodiments of the present invention.

FIG. 7 is a simplified block diagram of a computer system 700 that may incorporate embodiments of the present invention. FIG. 7 is merely illustrative of an embodiment incorporating the present invention and does not limit the scope of the invention as recited in the claims. One of ordinary skill in the art would recognize other variations, modifications, and alternatives.

In one embodiment, computer system 700 includes processor(s) 710, random access memory (RAM) 720, disk drive 730, input device(s) 740, output device(s) 750, display 760, communications interface(s) 770, and a system bus 780 interconnecting the above components. Other components, such as file systems, storage disks, read only memory (ROM), cache memory, codecs, and the like may be present.

RAM 720 and disk drive 730 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, input device 740 is typically embodied as a computer mouse, a trackball, a track pad, a joystick, a wireless remote, a drawing tablet, a voice command system, an eye tracking system, a multi-touch interface, a scroll wheel, a click wheel, a touch screen, an FM/TV tuner, audio/video inputs, and the like. Input device 740 may allow a user to select objects, icons, text, and the like, via a command such as a click of a button or the like. In various embodiments, output device 750 is typically embodied as a display, a printer, a force-feedback mechanism, an audio output, a video component output, and the like. Display 760 may include a CRT display, an LCD display, a Plasma display, and the like.

Embodiments of communications interface 770 may include computer interfaces, such as include an Ethernet card, a modem (telephone, satellite, cable, ISDN), (asynchronous) digital subscriber line (DSL) unit, FireWire interface, USB interface, and the like. For example, these computer interfaces may be coupled to a computer network 790, to a FireWire bus, or the like. In other embodiments, these computer interfaces may be physically integrated on the motherboard or system board of computer system 700, and may be a software program, or the like.

In various embodiments, computer system 700 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer system 700 may also include an operating system, such as Mac OS X®, Linux®, Microsoft Windows®, real-time operating systems (RTOSs), open source and proprietary OSs, and the like.

FIG. 7 is representative of a media player and/or computer system capable of embodying the present invention. It will be readily apparent to one of ordinary skill in the art that many other hardware and software configurations are suitable for use with the present invention. For example, the media player may be a desktop, portable, rack-mounted or tablet configuration. Additionally, the media player may be a series of networked computers. Moreover, the media player may be a mobile device, an embedded device, a personal digital assistant, a smartphone, and the like. In still other embodiments, the techniques described above may be implemented upon a chip or an auxiliary processing board.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A transmitting device comprising:
a processor; and
a transmitter coupled with the processor,
wherein the processor in conjunction with the transmitter is configured to:
receive a first input indicative of a first event;
enable power to the transmitter in response to the first input;
transmit a first plurality of data packets;
receive a second input indicative of a second event; and
disable the power to the transmitter in response to the second input.

2. The transmitting device of claim 1 wherein the first event comprises operation of a user control associated with the transmitting device.

3. The transmitting device of claim 2 wherein the user control comprises a button.

4. The transmitting device of claim 1 wherein the first plurality of data packets include one or more data packets comprising a payload indicative of information associated with the first event.

5. The transmitting device of claim 1 wherein the processor is further configured to transmit a second plurality of data packets in response to the second input.

6. The transmitting device of claim 5 wherein the second plurality of data packets comprise information associated with the second event.

7. The transmitting device of claim 1 wherein each of the first plurality of data packets comprises same payload.

8. The transmitting device of claim 1 wherein the first plurality of data packets are transmitted in about 8 milliseconds.

9. A media player comprising:
a processor;
a storage medium coupled to the processor;
a user interface coupled to the processor; and
a transmitter coupled to the processor,
wherein the processor in conjunction with the transmitter is configured to:
receive a first input via the user interface, the first input indicative of a first event;
enable power to the transmitter in response to the first event;
transmit a first sequence of data packets, wherein one or more data packets in the first sequence of data packets comprise information about the first event; and
disable power to the transmitter subsequently to transmitting the first sequence of data packets.

10. The media player of claim 9 wherein the processor is further configured to:
receive a second input via the user interface, the second input indicative of a second event;
transmit a plurality of data packets comprising information about the second event; and
disable power to the transmitter in response to the second input.

11. A non-transitory computer readable medium storing a plurality of instructions for controlling a processor to transmit data packets, the plurality of instructions comprising:
instructions that cause the processor to receive a first input;
instructions that cause the processor to enable power to a transmitter based on the first input;
instructions that cause the processor to transmit a first set of data packets;
instructions that cause the processor to receive a second input;
instructions that cause the processor to transmit a second set of data packets in response to the second input; and
instructions that cause the processor to disable power to the transmitter.

12. The computer readable medium of claim 11 wherein the first set of data packets comprise data associated with the first input.

13. The computer readable medium of claim 11 wherein all data packets in the set of first data packets comprise same payload information.

14. The computer readable medium of claim 11 wherein a time interval between transmission of successive data packets in the first set of data packets is same for all data packets in the first set of data packets.

* * * * *